(12) United States Patent
Orlov et al.

(10) Patent No.: US 10,257,009 B2
(45) Date of Patent: Apr. 9, 2019

(54) METHOD FOR MULTICHANNEL SIGNAL SEARCH AND DEMODULATION AND TECHNIQUE TO DEMODULATE AND DETECT DBPSK FDMA ULTRA-NARROW BAND SIGNAL

(71) Applicants: Andrey Orlov, Moscow (RU); Vasiliy Anisimov, Moscow (RU)

(72) Inventors: Andrey Orlov, Moscow (RU); Vasiliy Anisimov, Moscow (RU)

(73) Assignee: WAVIOT INTEGRATED SYSTEMS, LLC, Watertown, SD (US)

( * ) Notice: Subject to any disclaimer, the term of this patent is extended or adjusted under 35 U.S.C. 154(b) by 0 days.

(21) Appl. No.: 15/858,760

(22) Filed: Dec. 29, 2017

(65) Prior Publication Data

US 2018/0367354 A1 Dec. 20, 2018

Related U.S. Application Data

(60) Provisional application No. 62/440,906, filed on Dec. 30, 2016.

(51) Int. Cl.
| | | |
|---|---|---|
| *H04L 27/26* | (2006.01) | |
| *H04L 12/66* | (2006.01) | |
| *H04L 27/00* | (2006.01) | |
| *H04L 27/22* | (2006.01) | |
| *H04L 27/233* | (2006.01) | |

(52) U.S. Cl.
CPC ........... *H04L 27/265* (2013.01); *H04L 12/66* (2013.01); *H04L 27/00* (2013.01); *H04L 27/22* (2013.01); *H04L 27/2335* (2013.01); *H04L 27/2655* (2013.01)

(58) Field of Classification Search
CPC combination set(s) only.
See application file for complete search history.

(56) References Cited

U.S. PATENT DOCUMENTS

| | | |
|---|---|---|
| 5,668,837 A | 9/1997 | Dent |
| 5,960,040 A | 9/1999 | Cai et al. |
| 5,974,098 A | 10/1999 | Tsuda |
| 6,115,728 A | 9/2000 | Nakai et al. |
| 7,508,889 B2 | 3/2009 | Liu |
| 8,156,209 B1 | 4/2012 | Phadnis et al. |
| 9,049,732 B2 | 6/2015 | Fourtet et al. |
| 9,252,998 B2 | 2/2016 | Seely |
| 10,044,098 B2 | 8/2018 | Ali |
| 2003/0224725 A1 | 12/2003 | Limberg |
| 2004/0096021 A1 | 5/2004 | Koval |
| 2005/0188129 A1 | 8/2005 | Abdelilah et al. |
| 2006/0094383 A1 | 5/2006 | Zylowski |
| 2006/0133827 A1 | 6/2006 | Becouarn et al. |
| 2006/0251190 A1 | 11/2006 | Wang et al. |
| 2006/0285607 A1 | 12/2006 | Strodtbeck et al. |
| 2007/0268980 A1 | 11/2007 | Brannstorm et al. |
| 2007/0280098 A1* | 12/2007 | Bhatt ............... H04L 27/2656 370/208 |
| 2008/0151985 A1 | 6/2008 | Chin et al. |
| 2008/0240285 A1* | 10/2008 | Han ................ H04L 5/0007 375/295 |
| 2011/0032920 A1* | 2/2011 | Suberviola ........... H04B 1/7075 370/342 |
| 2011/0289156 A1 | 11/2011 | Pirnazar |
| 2012/0014488 A1 | 1/2012 | Liu et al. |
| 2012/0051287 A1 | 3/2012 | Merlin et al. |
| 2012/0195184 A1 | 8/2012 | Dapper et al. |
| 2013/0202068 A1 | 8/2013 | Ly-Gagnon et al. |
| 2015/0092753 A1 | 4/2015 | Gupta et al. |
| 2016/0119184 A1 | 4/2016 | Soriaga et al. |
| 2016/0335897 A1 | 11/2016 | Naserian et al. |
| 2016/0373138 A1 | 12/2016 | Li et al. |
| 2017/0139053 A1 | 5/2017 | Vishin et al. |
| 2017/0171841 A1 | 6/2017 | Chen et al. |

FOREIGN PATENT DOCUMENTS

| | | |
|---|---|---|
| CN | 106341876 A | 1/2017 |
| CN | 107135554 A | 9/2017 |
| WO | 2012027880 A1 | 3/2012 |
| WO | WO/2012/027880 | 8/2012 |
| WO | 2017197441 A1 | 11/2017 |

OTHER PUBLICATIONS

Wenxu Zhang et al., "Application of Fft parallel code phase search algorithm in GNSS software" 2016 IEEE 13th International Conference on Signal Processing (ICSP). Online at https:ieeexplore.ieee.org/abstract/document/7878011/.
KERLINK, Wirnet Station, Embedded Base Station Controller and Radio Network Controller, for remote operations, retrieved from https://www.kerlink.com/product/wirnet-station/ on Sep. 13, 2018.
SIGFOX Wireless Ethernet Gateway, retrieved from https://partners.sigfox.com/products/sigfox-wireless-ethernet-gateway, on Sep. 13, 2018.
Device—Wireless Gecko by Silicon Labs—information retrieved from https:/lwww.silabs.com/products/wireless/wireless-gecko-iot-connectivity-portfolio on Aug. 15, 2018.
Device—AX5043—Advanced High Performance ASK and FSK Narrow-band Transceiver for 27-1050 MHz Range, or Semiconductor, retrieved from https:/lwww.onsemi.com/pub/Collateral/AX5043-D.PDF on Aug. 15, 2018.
Notice of Allowance with regard to the counterpart U.S. Appl. No. 16/220,188 dated Feb. 13, 2019.
Notice of Allowance with regard to the counterpart U.S. Appl. No. 15/858,784 dated Feb. 7, 2019.

* cited by examiner

*Primary Examiner* — Wednel Cadeau
(74) *Attorney, Agent, or Firm* — BCF LLP

(57) ABSTRACT

Described is a method of searching of multichannel signal and technique of demodulating and detecting DBPSK frequency division multiple access (FDMA) ultra-narrow band signal. A search is based on algorithm encompassing a signal-processing signal, and technique to demodulate and detect FDMA ultra-narrow band together with a method to increase time-frequency resolution.

6 Claims, No Drawings

METHOD FOR MULTICHANNEL SIGNAL SEARCH AND DEMODULATION AND TECHNIQUE TO DEMODULATE AND DETECT DBPSK FDMA ULTRA-NARROW BAND SIGNAL

PRIORITY CLAIM/INCORPORATION BY REFERENCE

The present application claims priority to U.S. Provisional Patent Applications: 62/440,906 filed on Dec. 30, 2016 entitled "A method for multichannel signal search and demodulation"; and hereby incorporates by reference, the entire subject matter of this Provisional Application.

BACKGROUND INFORMATION

Many applications require sufficient multichannel reception of signals. Search for signals could easily be accomplished by series of Fourier Platforms, but its time and frequency resolution is insufficient to demodulate found signals effectively. Using narrowband signals is one of simplest ways to improve efficiency and reliability of transmission, but it is limited by carrier frequency uncertainty resulting in carrier frequency offset in receiver. In most systems, carrier frequency must be relatively low compared to signal bandwidth.

In some prior art solutions, signal bandwidth is increased, and noise tolerance is managed using some sort of error-correction coding of just repetitions. For example, LoRa wireless protocol is widely known. It uses chirp spread spectrum, utilizing very wide bands compared to information speed of transmission. LoRa uses CDMA multiple access, which is different from the solution proposed in the present invention.

SigFox is another prior art solution employing multichannel receivers with carrier tracking. This solution is limited by computational inefficiency of carrier tracking systems. Also, it is algorithmically and computationally difficult to employ error correction coding in such systems, as they are limited by noise tolerance of carrier tracking systems. So, some sort of code-aided tracking might be necessary, which may be further complicating such solutions.

The present invention solves two main problems related to wireless communications: receiving many simultaneous messages and receiving narrowband messages with frequency offset greater than signal bandwidth. These problems are common for many m2m and Low-Power Wide Area Network (LPWAN) communication systems. LPWAN systems must transmit and receive many signals simultaneously and efficiently.

SUMMARY

The present invention relates to method of multichannel signal search based on algorithm comprising a choosing Fourier transform size according to symbol length, calculating frequency resolution, calculating number of frequency shifts to achieve time resolution, performing multiple Fourier transforms for each unique frequency shift and starting time offset pair. In addition, the algorithm uses direct quadrature components of phase information of resulting frequency domain signal to search and demoduluate signals.

Furthermore, method involves signal processing scheme and technique to demodulate and detect (FDMA) ultranarrow band (UNB) signal together with a method to increase time-frequency resolution.

DETAILED DESCRIPTION

The present invention maybe further understood with reference to the following description. An exemplary embodiment of the present invention provides multichannel signal search allowing demodulation based on very computationally efficient Fourier transform with improved frequency and time resolution. Also, it allows demodulation using three independent channels in frequency domain.

The algorithm sets length of Fourier transform equal to or lower than the length of a transmitted symbol. This allows direct usage of obtained frequency domain data for signal modulation, if time data is fed to consecutive Fourier transforms each of which starts close to beginning of each new consecutive symbol.

Then, as time and frequency resolution of such transform do not allow consistent data transfer, additional series of transforms with different starting time offsets and frequency shifts need to be performed.

At least two additional frequency shifts are required, in the case of two shifts each shifting time domain data by one and two thirds frequency resolution value of Fourier transform.

At least three additional initial offsets must be considered, in the case of three offsets constituting of one, two, and three quarters of transform size.

Each unique shift-offset pair forms three independent channels, allowing signal decoding and demodulation based on in-phase and quadrature components and on phase information.

The exemplary embodiment includes several signal processing modules or blocks. Block to perform time and frequency shift, block of a fast Fourier transform (FFT), module of differential binary phase-shift keying (DBPSK) demodulator, module of signal detection.

The time-frequency shift block comprises the following parts. First, memory block for storing input time-domain information. In some cases, real input is used, in other cases quadrature input is used. Second, frequency shift block comprising a sine wave generation block and a complex multiplier. In some cases, sine frequency generation block is a DDFS block. This block generates a given frequency and shifts input data by this frequency. Third, time shift block, this blocks shifts data in time domain using the memory block, where data is stored.

This time- and frequency shift block is used to increase time and frequency resolution of proposed method of demodulation. In some cases, used frequency shifts are equal to one third and two thirds of single FFT bin.

FFT block performs Fourier transform. In some cases, this is a real Fourier transform. In other cases, a complex Fourier transform is performed. This block takes time-frequency shifted time-domain data as input and outputs frequency-domain quadrature data.

DBPSK demodulator can be implemented either by complex conjugate multiplication of current and preceding samples or via phase subtraction of current and preceding samples.

Detection process of signal's preamble is performed along both axis of signal's 2d vector space if complex conjugate multiplication in DBPSK demodulator block, or it is performing preamble search with several phase rotations if phase subtraction is used in DBPSK demodulator.

The components are connected serially, and input information is fed to a block performing a number time-frequency shifts. The output of this module is connected to the FFT module. Transformed data from FFT module goes to a parallel structure of identical modules performing DBPSK demodulation in frequency domain and signal detection for each unique time-frequency shift. Each demodulated stream corresponding to each time-frequency shift is also stored in a unique cyclic buffer for further processing. In some cases, this buffer is connected serially to the output port of signal detection block. In other cases, this buffer is connected parallel with preamble search block to the output of DBPSK demodulation block.

In some cases, all output data from FFT block for every unique FFT channel, time and frequency shift combination is stored in these cyclic buffers.

In some cases, only one data stream per unique FFT channel and time shift is stored.

The choice as to which unique Fast Fourier Transform (FFT) channel, time and frequency shift combination to choose, is made based on output of preamble detection block.

The exemplary embodiment involves manner in which components are connected and used and the following of features of algorithm. First, one FFT transform is used for both signal detection and demodulation, preamble detection block is performing header search without interruptions even when messages are being demodulated and stored in cyclic buffers.

Both preamble detection and demodulation blocks as well as cyclic buffers can process any number of header detection events in different FFT channels simultaneously.

It is possible to process many header detection events in the same FFT channel, is many data streams per channel are stored.

In some cases all headers detected in one channel at different moments in time even in case of overlap.

In other cases only one active header event per channel is processed at time. The decision which event to process is made in preamble search block.

The decision if message is valid or not is made only after whole message is received. All blocks in receiver work always so there is no risk of message loss in case of false alarm. Many messages can be received simultaneously at any time.

There is no difference between a message with huge carrier offset and message on different channel and therefore, there is no difference in receiving messages with any kind of frequency offset. There are methods to receive many simultaneous messages with unknown carrier offset but most of these methods require some rough header search with FFT, and then demodulation of found signals, usually using phase locked loops or other algorithms with carrier tracking capabilities. All these methods are not as computationally effective as the proposed herein method.

What is claimed is:

1. A method for demodulating independent channels, the method comprising:
    setting a length of a Fourier transform (FFT) to be equal to or lower than the length of a transmitted symbol;
    performing additional of series of transforms with different starting time offsets and frequency shifts;
    adding two series of transforms with different frequency shifts, wherein one of the series is shifted by one and the other is shifted by two thirds frequency resolution value of the FFT; and
    adding three series of transform with different initial time offsets, wherein an initial offset of one, two or three-quarter of transform size is applied to a respective one of the series of transforms, each unique shift-offset pair forming three independent channels,
    simultaneously decoding and demodulating the three independent channels in frequency domain based on in-phase and quadrature components and on phase information.

2. The method of claim 1, wherein the performing addition of series of transforms with different starting time offsets and frequency shifts comprises
    a memory block for storing input time-domain information;
    a frequency shift block comprising a sine wave generation block and a complex multiplier,
    where said sine wave generation block generates a given frequency and shifts input data by this frequency; and
    a time shift block that shifts data in time domain using the memory block where data is stored.

3. The method of claim 1, further comprising signal detection and demodulation where a preamble detection and demodulation block performs a header search without interruptions even when messages are being demodulated and stored in a cyclic buffer.

4. The method according to claim 3, wherein the preamble detection and demodulation block and the cyclic buffer process any number of header detection events in different FFT channels simultaneously.

5. The method according to claim 3, further comprising making a decision of validity of message after a whole message is received with simultaneous receipt of messages at any time and with any frequency offset.

6. The method according to claim 4, wherein the preamble detection and demodulation block processes and stores many header detection events with many data streams per channel.

* * * * *